UNITED STATES PATENT OFFICE.

ARVID NILSON, OF CHICAGO, ILLINOIS.

MANUFACTURE OF CEREAL EXTRACT.

1,120,328. Specification of Letters Patent. Patented Dec. 8, 1914.

No Drawing. Application filed June 15, 1914. Serial No. 845,322.

*To all whom it may concern:*

Be it known that I, ARVID NILSON, a subject of the King of Sweden, residing at Chicago, in the county of Cook and State of Illinois, have invented a new and useful Improvement in the Manufacture of Cereal Extract, of which the following is a specification.

The object of my invention is to produce a new and improved food-product in the form of an extract of malted cereal, preferably wheat, though rye, barley and other cereals may be used, which shall resemble ordinary commercial beef-extract in taste and appearance and be palatable, and wholesome and nourishing to the human system, but devoid of the glue-like odor of such beef-extract and free from uric acid.

To produce my improved article, I observe the following procedure, using wheat as the cereal: The cereal, after being thoroughly cleansed, is steeped in water of ordinary temperature, say at 60° to 70° F., for a period of from 24 to 48 hours. It is then caused to germinate, in the usual or any suitable manner in manufacturing malt, but preferably in the dark to prevent greenness of the resultant sprouts. The germinating procedure is conducted under a comparatively high temperature, say of about 70° F., to produce rapid growth of the cereal and conditions favorable to development of the lactic acid bacteria present on the grains. At this temperature the germination requires about three days. The cereal is preferably not kiln dried, or parched, for my purpose, since the best results are obtained by treating it, as hereinafter described, in its moist and green condition. The germinated cereal is crushed and a mash is made of it with about four times its own weight of water, to which about one-half of one per cent., by weight, of sodium chlorid (common table-salt) is added. The temperature of the mash is maintained at 115° to 120° F., or thereabout, for six hours, more or less, is then gradually (within about a half hour) raised to 160° F., or thereabout, and is kept at the last-named temperature until the malt is fully converted by complete saccharification of the starch. The resulting wort is then strained off from the grains and its temperature is reduced to about 100° F., when yeast containing lactic acid bacteria is added (without previously boiling the wort) and fermentation is allowed to proceed at about that temperature. The principal fermentation, conducted under these conditions, is nearly completed in about twelve hours, during which the yeast will settle to such an extent that the wort can be almost entirely run off without requiring filtration. The retention of a slight quantity of yeast in the liquid is not objectionable, however. This fermented wort, now strongly acidulated with lactic acid, is heated nearly to the boiling point, and the acidity is then neutralized by adding sodium carbonate until the wort shows a decided alkaline reaction. The wort is then heated, preferably at the boiling temperature, for about an hour, and in the meantime common table salt is added in the same quantity as in the mashing step. The boiling expels the alcohol produced by the fermentation, and this alcohol, when caught and condensed, forms a valuable by-product. The yeast used for producing the fermentation also affords a valuable by-product, since it is uncontaminated and pure, and may therefore be used for general alcoholic fermentation purposes. Since the wort is not boiled previous to fermenting it, the coagulable albumin formed by mashing the cereal precipitates in large flakes, which have a meaty taste and afford a palatable, nutritious and valuable by-product. The liquid is allowed to rest, for a short time, after boiling, during which these flakes of albumin precipitate to the bottom of the liquid container. By boiling the fermented acidulated wort in an alkaline condition, as described, the action of the alkali corresponds somewhat to that of the enzym trypsin and the strongly alkaline bile on the acid gastric juices in the animal digestive organs, and imparts to the liquid a decidedly meaty taste and flavor, resembling that of diluted beef-extract. When the albumin flakes have precipitated, the liquid is filtered to separate it therefrom and may then be evaporated to the desired consistency of a fluid or a semi-fluid or paste, in which condition it may be used as soup-stock and for other purposes for which beef-extract is used, which my improved article closely resembles in taste and appearance, differing from most beef-extracts, however, in its freedom from the taste and odor of glue and from uric acid. Moreover, because of the carbohydrates and proteids my product contains, it is more nutritious than the beef-extract of commerce; and, particularly, by reason of a large part of the sugar in the wort being removed by fermentation, thereby reducing (by three-fourths, or thereabout) the excessively large proportion contained in ordinary malt-extracts, of sugar to proteids, to a better-balanced ratio in my improved product, the latter affords a food in all respects desirable.

What I claim as new and desire to secure by Letters Patent is:—

1. The process of manufacturing malt extract, which consists in mashing the malted cereal, acidulating and fermenting the unboiled wort, introducing an alkali into the fermented wort and heating the latter, and separating the resultant liquid from the flaky albumin precipitated therein.

2. The process of manufacturing malt extract, which consists in mashing malted cereal in a green condition, drawing off the wort, acidulating and fermenting the unboiled wort and then separating it from the yeast, then introducing sodium carbonate into the fermented wort and heating the latter, separating the resultant liquid from the flaky albumin precipitated therein and finally condensing the liquid.

3. The process of manufacturing malt extract, which consists in mashing in water containing chlorid of sodium crushed malted cereal in a green condition, drawing off the wort, acidulating and fermenting the unboiled wort and then separating it from the yeast, introducing sodium carbonate and sodium chlorid into the wort and heating the latter, and separating the resultant liquid from the flaky albumin precipitated therein.

4. As a new article of manufacture, a palatable and nutritious yeast-fermented and slightly alkaline extract of malt resembling beef-extract in appearance and taste.

ARVID NILSON.

In presence of—
  O. C. AVISUS,
  A. C. FISCHER.